Dec. 27, 1927.
W. J. KENT ET AL
1,654,173
MACHINE FOR TRIMMING FLASH FROM RUBBER ARTICLES
Filed Sept. 16, 1925    3 Sheets-Sheet 1
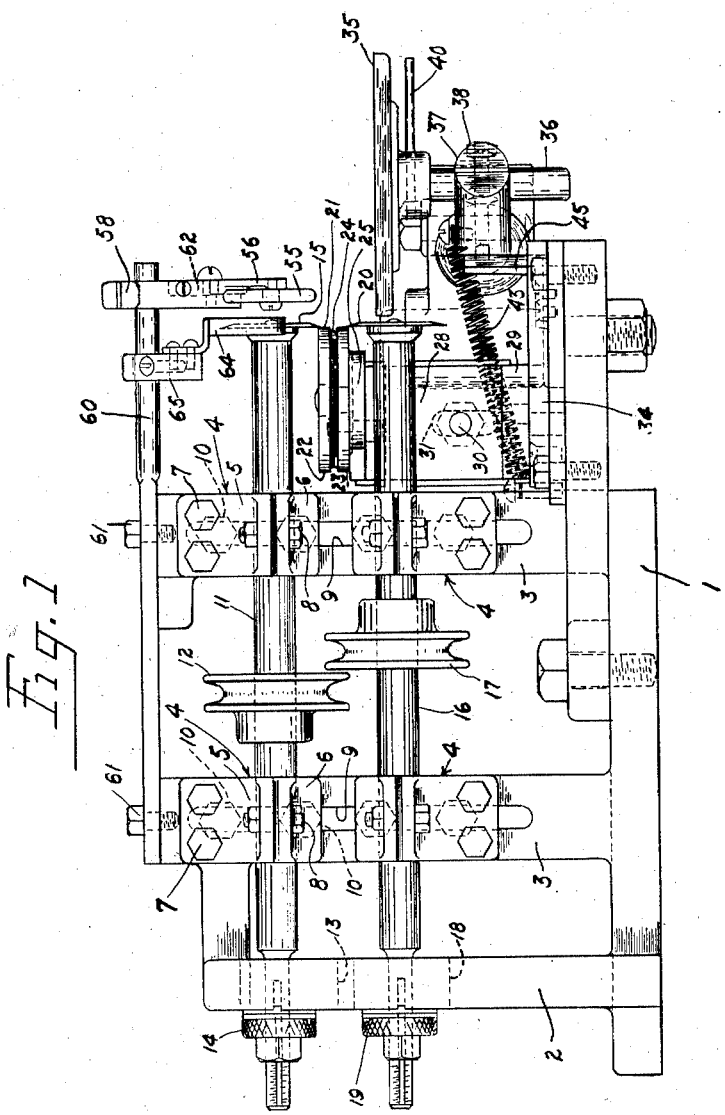
Inventors
WILLIAM J. KENT
EDWARD MARTIN
FRANK KOCHAN
By their
Attorney

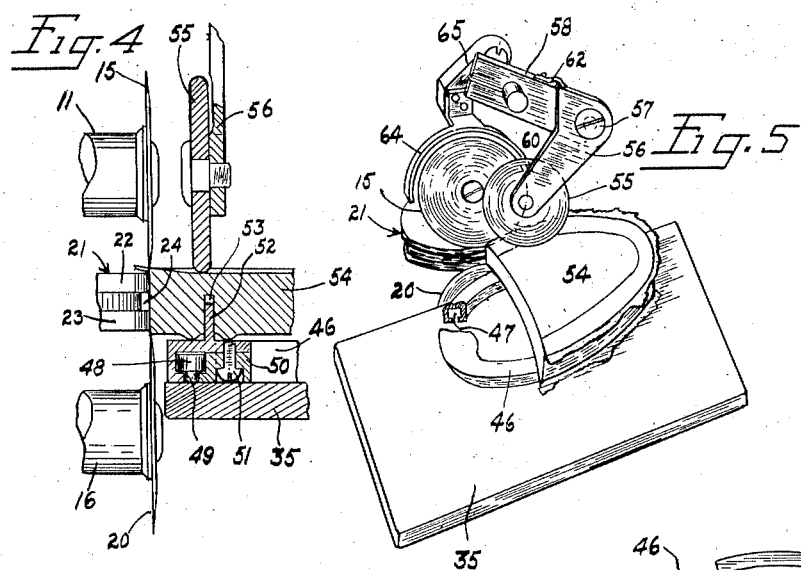

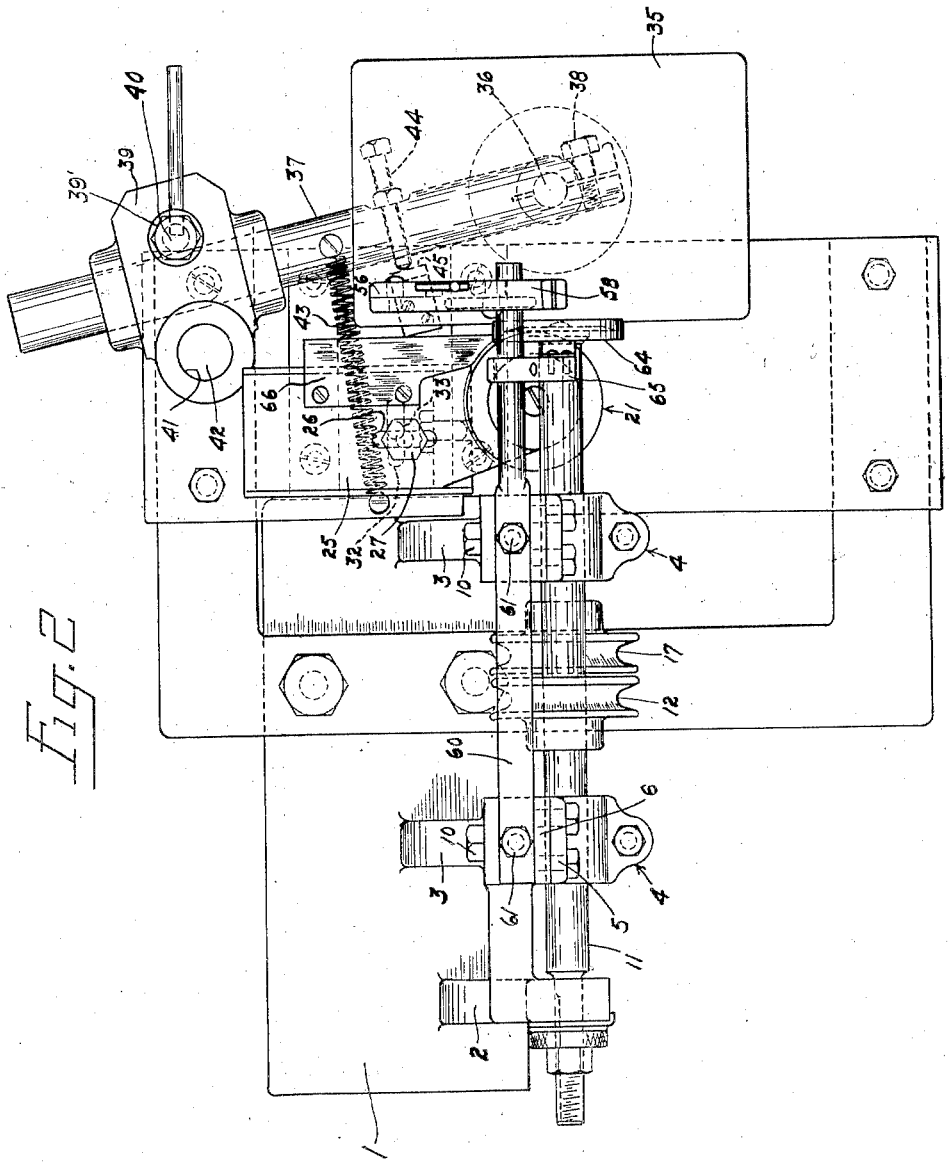

Patented Dec. 27, 1927.

1,654,173

UNITED STATES PATENT OFFICE.

WILLIAM J. KENT, OF BROOKLYN, NEW YORK, AND EDWARD MARTIN AND FRANK KOCHAN, OF CHICAGO, ILLINOIS, ASSIGNORS TO THE MECHANICAL RUBBER COMPANY, OF CHICAGO, ILLINOIS, A CORPORATION OF NEW JERSEY.

MACHINE FOR TRIMMING FLASH FROM RUBBER ARTICLES.

Application filed September 16, 1925. Serial No. 56,721.

This invention relates to a machine for trimming the flash from rubber articles, more particularly the flash formed in the molding of rubber heels.

In the molding and vulcanizing of various rubber articles, such as rubber heels, it is necessary to provide a slight excess of material in the blank from which the article is molded in order to insure the complete filling of the mold, and during the molding operation provision is made for the escape of the excess material, which is technically known as the "flash". In the molding of rubber heels this excess material or flash forms projecting fins around the upper and lower edges of the heel. Originally it was the practice to trim this flash from the heels by hand, which is a laborious and time-consuming operation, and if the operator is inexperienced or careless this operation is frequently improperly performed thereby either leaving a portion of the flash on the heel or cutting into the body of the heel itself. More recently machines have been devised for trimming the flash, but as far as we are aware it is necessary to cut the top and bottom flash portions in separate operations, which still leaves much to be desired in the way of a rapid and entirely satisfactory trimming machine.

An object of our invention is to provide a machine for simultaneously trimming the flash from molded rubber articles at a plurality of points.

Another object is to provide an improved flash trimmer for rubber heels.

A further object is to provide an improved form of work holder.

Other objects will appear from the detailed description of the invention and claims.

The invention consists broadly in cutting elements adapted to simultaneously operate upon two spaced flash portions of a molded rubber article, and another cutting element working in co-operation with the first-named cutting elements, and a work holder movable in co-operation with the cutting elements and constrained to move in a closed path. The invention also comprises means for guiding from the cutting point flash material removed by the cutting elements.

For a detailed disclosure of the nature and objects of the invention reference is had to the accompanying specification and drawings, in which latter:

Fig. 1 is a side elevation of the machine;
Fig. 2 is a top plan view thereof;
Fig. 3 is a front elevation;
Fig. 4 is an enlarged detail illustrating the manner of trimming the flash;
Fig. 5 is a detail perspective partly broken away;
Fig. 6 is a bottom plan view of a work holder and superposed heel; and
Fig. 7 is a side elevation partly broken away of the supporting means for the rotary cutting element.

Referring to the drawings the numeral 1 designates a base provided at its rear with an upright or frame member 2 and also with two aligned uprights 3 which are laterally offset with respect to the upright 2. Secured to the upper part of the uprights 3 are a pair of bearings designated generally by the numeral 4, and as these bearings are alike in all respects but one of them will be described. Each bearing is split and formed of two parts 5 and 6, the part 6 extending upwardly in rear of the part 5 and being conected thereto by the screws 7 (Figures 1 and 2). The bearing can be tightened by means of the bolt 8 extending through the outer horizontal projecting ends of the parts 5 and 6. In order that each bearing as a whole may be vertically adjusted on its respective upright 3 the latter are provided with slots 9 and screws 10 which extend through said slots and are threaded into the bearing members 6. Mounted in the bearings is a shaft 11 having secured thereon a drive pulley 12 which may be driven from any suitable source of power. At its rear end the shaft 11 is reduced in size and passes through a slot 13 in the upright 2, thereby permitting vertical adjustment of the shaft. Secured on the rear end of the shaft is an adjustable thrust bearing 14, while disposed on the forward end of the shaft is a bevel-edged disc cutter 15. Below the previously mentioned bearings 4 a second pair of bearings 4 are adjustably secured to the uprights 3 in a similar manner and mounted in these bearings is a shaft 16 provided with a drive pulley 17 which may be actuated in any desired manner. The reduced end of the shaft 16 projects through a slot 18 in the upright 2 similar to the slot 13, and secured on the rear end of the shaft is an adjustable thrust bearing 19, while disposed on the forward end of the shaft is a second bevel-edged disc cutter 20.

Co-operating with the cutters 15 and 20 is a rotary cutting element 21 rotatable on a vertical axis, preferably ball bearing. The cutting element 21 is so disposed that the upper and lower portions 22 and 23 of its periphery co-operate respectively with the cutting discs 15 and 20 while the intermediate portion of its periphery is cut away as shown at 24 to form a flash guide and receptacle in a manner to be later described. In order that the cutting element 21 may be properly disposed in relation to the cutters 15 and 20 in their various adjustments the element 21 is also adjustably mounted as follows: Its bearing is secured directly to a horizontal plate or support 25, the plate being provided with a longitudinal slot 26 (Figs. 2 and 7) through which passes a set screw 27, the latter being threaded into the horizontal arm of an angle member 28. Therefore by loosening the set screw 27 the plate 25 and supported cutting element 21 may be horizontally adjusted laterally of the machine. The vertical arm of the angle member 28 is adjustably secured to the vertical arm of a second angle member 29 by a set screw 30 passing through a slot 31 in the member 29 and threaded into the member 28. By means of this adjustment the vertical position of the cutting element 21 may be varied. The lower horizontal portion of the angle member 29 is provided with a slot 32 disposed at right angles to the slot 26 and a set screw 33 extends through this slot and is threaded into the base plate 34. By means of this adjustment the cutter element 21 may be horizontally adjusted longitudinally of the machine.

Adjacent the cutting elements a work table 35 is provided which is adjustably mounted in the following manner. Projecting from the bottom of the work table is a supporting rod or shank 36 which passes through the split end of a horizontal supporting arm 37, and the shank 36 may be held in adjusted position by means of the set screw 38. At its opposite end the supporting arm extends through a clamp block 39 provided with a clamp 39', which clamp may be tightened by the lever arm controlled set screw 40. The clamp block 39 is also provided with a vertical bore 41 which rotatably fits over a spindle 42 projecting upwardly from the base of the machine. By this construction the table may be swung on the spindle 42 as an axis toward or away from the cutting elements. In order to yieldingly maintain the table adjacent the cutting elements a coil spring 43 is secured at one end to the arm 37 and at the other end to the base of the machine, and its movement under the influence of spring 43 is limited by an adjustable stop screw 44 extending through the arm 37 and contacting with a fixed stop 45 on the base of the machine.

Mounted on the work table is a work holder 46 of a general oval or elliptical ring form, this work holder being provided on its under side with a continuous T-shaped slot or groove 47. Disposed in this slot is a roller 48 mounted on a pin 49 secured to the work table adjacent the cutters, and in order to permit the ready removal when desired of the work holder from the roller 48 a portion of the inner wall of the work holder may be cut away and replaced by a plug 50 secured to the work holder by the screw 51. When it is desired to remove the work holder all that is necessary is to remove the plug 50 and rotate the work holder until the roller 48 is in registry with the opening. On its upper surface the work holder is provided with a desired number of pins 52 (Figure 4) disposed to enter the nail holes 53 in a molded heel 54 so as to fixedly maintain the heel on the work holder. In order to prevent upward displacement of the heel on the work holder a presser wheel 55 is provided for engagement with the upper surface of the heel, this wheel being mounted on an arm 56 pivotally connected at 57 to a reduced end portion of an arm 58, the arm 58 being split at its opposite end and adjustably held by the screw 59 on a rod or support 60, which latter may be secured by the screws 61 to the upper ends of the uprights 3. To resiliently press the wheel 55 against the heel a spring 62 is secured on the arm 58 with its free end pressing against the arm 56. In order to limit the downward movement of the arm 56 a stop screw 63 is provided (Figure 3).

A curved guard 64 is disposed over the upper cutting element 15, this guard being secured to an arm 65 mounted on the rod 60. In order to prevent sagging of the upper flash portion as it is fed to the cutting elements a guide 66 is provided, the tapered end of which extends adjacent the cutting point, this guide being secured to the plate 25 carrying the cutting element 21, thereby insuring that the guide 66 will be always in proper fixed relation to the upper peripheral portion 22 of the cutting element 21.

In operation, the cutting elements 15, 20 and 21 and the table 35 are properly adjusted for the size of heel to be trimmed, the proper size work holder disposed on the roller 48, and the machine started. The operator then disposes a heel with its nail holes in position over the pins 52 on the work holder and starts the cutting at the corner of the heel when the latter is in the position shown in Figure 5. As the cutters rotate the cutting element 15 in co-operation with the upper portion 22 of the rotatable element 21 severs the upper flash portion from the heel, this flash portion having been held in proper position by the guide 66. At the same time the cutting element 20 in co-operation with the portion 23 of the cutting element 21 cuts off the lower flash portion from the heel, and the movement of the cutting elements causes the work holder to move past the roller 48 until the entire flash on the sides of the heel has been trimmed off, the heel and work holder at the finish of this operation occupying a position directly opposite to that shown in Figure 5. In the absence of groove 24 the lower flash portion would tend to jam in between the periphery of the cutter 21 and the cutter 20, but by the present construction it is carried by the rotary movement up into the groove 24 in the element 21 and falls off to one side, while the upper flash portion falls to one side.

It will be seen that by the use of our machine the operation of trimming the flash on both the upper and lower side edges of a heel can be performed at the same time, thereby greatly reducing the time required for the trimming operation. By reason of the T-shaped groove in the bottom of the work holder and the continuous form of this groove the work holder cannot become accidentally displaced during a cutting operation but it can be readily removed when desired for purposes of change or repair. While a specific embodiment of the invention has been described it is obvious that the machine is not limited in its application to the trimming of rubber heels but may be applied to numbers of other articles where it is desired to remove more than one flash portion at the same time.

Having thus described our invention what we claim and desire to protect by Letters Patent is:—

1. A trimming device comprising co-operating cutting elements, a movable work holder co-operating therewith, said holder having an elongated endless guide channel, and relatively fixed holder retaining means disposed in said channel.

2. A trimming device comprising co-operating cutting elements, a work table, a work holder movable on said table in co-operative relation to the cutting elements, said holder having an oval guide channel therein, and a roller fixedly mounted on the table and disposed in said channel.

3. A trimming device comprising co-operating cutting elements, a work table, a work holder movable on said table in co-operative relation to the cutting elements, said holder having a T-section endless guide channel, and a roller fixedly carried on said table and disposed within said channel.

4. A trimming device comprising co-operating cutting elements for simultaneously trimming a plurality of flash portions from a molded rubber article, said elements including means for conducting away trimmed material, and a work holder co-operating with the cutting elements and movable in a closed path.

5. A trimming device comprising spaced cutting elements, an intermediate cutting element co-operating with the first two, and a movable work holder co-operating with said cutting elements.

6. A trimming device comprising spaced cutting elements, an intermediate cutting element co-operating with the first two, said latter element being provided with means for conducting away waste trimmings, and a movable work holder co-operating with said cutting elements.

7. A trimming device comprising spaced cutting elements, an intermediate cutting element co-operating with the first two, said latter element being recessed to provide a passageway for waste trimmings, and a movable work holder co-operating with the cutting elements.

8. A trimming device comprising spaced cutting elements, an intermediate rotatable cutting element mounted to rotate in a plane perpendicular to the first two cutting elements and co-operating with them, and a movable work holder co-operating with the cutting elements.

9. A trimming device comprising spaced cutting elements, an intermediate rotary cutting element having portions coacting with each of the first-mentioned cutting elements, said intermediate cutting element being provided with a peripheral groove, and a movable work holder adjacent said cutting elements.

10. A trimming device comprising spaced rotary cutting elements, an intermediate rotary cutting element mounted on an axis at right angles to the axes of the first two elements, said intermediate element having spaced portions co-operating respectively with the first two cutting elements and being provided intermediate said spaced portions with a peripheral groove, and a movable work holder adjacent the cutting elements.

11. A trimming device comprising spaced rotary cutting elements, a rotatable intermediate cutting element having spaced portions on its periphery adapted to coact respectively with the first two cutting elements, said intermediate cutting element being provided with a peripheral groove intermediate said first two cutting elements for receiving waste trimmings, and a work holder adjacent said cutting elements and movable in a closed path.

12. A trimming device comprising spaced rotatable cutting elements, means for varying their spacing, an intermediate rotatable cutting element having its periphery in co-operative relation to said first two cutting elements, said periphery being provided with a groove for receiving waste trimmings, a work table, a work holder movable thereon, and means connecting the table and holder and constraining the holder to move in a closed path.

Signed at Chicago, county of Cook, State of Illinois, this 4th day of September, 1925.

WILLIAM J. KENT.

Signed at Chicago, county of Cook, State of Illinois, this 4th day of September, 1925.

EDWARD MARTIN.

Signed at Chicago, county of Cook, State of Illinois, this 4th day of September, 1925.

FRANK KOCHAN.